US009631688B2

(12) United States Patent
Kurosu et al.

(10) Patent No.: US 9,631,688 B2
(45) Date of Patent: Apr. 25, 2017

(54) ELECTROMAGNETIC CLUTCH (71) Applicant: OGURA CLUTCH CO., LTD., Gunma (JP)

(72) Inventors: Yoshihiro Kurosu, Gunma (JP); Takashi Yamaguchi, Gunma (JP); Yasuyuki Iizuka, Gunma (JP); Yoshikazu Arai, Gunma (JP)

(73) Assignee: OGURA CLUTCH CO., LTD., Gunma (JP)

( * ) Notice: Subject to any disclaimer, the term of this patent is extended or adjusted under 35 U.S.C. 154(b) by 0 days.

(21) Appl. No.: 15/076,262

(22) Filed: Mar. 21, 2016

(65) Prior Publication Data

US 2016/0281809 A1 Sep. 29, 2016

(30) Foreign Application Priority Data

Mar. 23, 2015 (JP) ................................. 2015-059467

(51) Int. Cl.
*F16D 67/06* (2006.01)
*F16D 27/112* (2006.01)
(Continued)

(52) U.S. Cl.
CPC ............ *F16D 67/06* (2013.01); *F16D 27/112* (2013.01); *F16D 27/14* (2013.01); *F16D 2027/007* (2013.01)

(58) Field of Classification Search
CPC ........ F16D 67/06; F16D 27/14; F16C 35/042; F16C 35/045; F16C 35/047; F16C 35/077; F16C 35/07; F16C 2226/54
See application file for complete search history.

(56) References Cited

U.S. PATENT DOCUMENTS 3,082,933 A 3/1963 Bernard
4,498,066 A * 2/1985 Fujiwara ................. F16D 67/06
188/164
(Continued)

FOREIGN PATENT DOCUMENTS

DE WO 2014079419 A1 * 5/2014 .............. F16C 27/04
EP 0 953 784 A2 11/1999
(Continued)

OTHER PUBLICATIONS

Machine Translation of WO2014079419.*
Search Report in European Patent Application No. 16160566.2 dated Sep. 5, 2016. 5 pages.

*Primary Examiner* — Stacey Fluhart
(74) *Attorney, Agent, or Firm* — Blakely Sokoloff Taylor & Zafman LLP (57) ABSTRACT

An electromagnetic clutch includes a rotation transmission member supported by an input shaft portion via a bearing. The rotation transmission member includes a movement regulating portion having abutment portions that abut against the bearing. The clutch further includes first and second spring members that bias an armature toward a braking member, and a connecting member overlaid on the movement regulating portion. The connecting member has first holes at portions facing the abutment portions, and second holes at portions facing regions between the abutment portions. One-end portions of the first and second spring members are attached to the armature. First fixing members inserted into the first holes fix the other-end portions of the first spring members to the connecting member. Second fixing members inserted into the second holes fix the other-end portions of the second spring members to the connecting member and fix the connecting member to the movement regulating portion.

3 Claims, 7 Drawing Sheets (51) Int. Cl.
*F16D 27/14* (2006.01)
*F16D 27/00* (2006.01)

(56) References Cited

U.S. PATENT DOCUMENTS

| | | | |
|---|---|---|---|
| 5,119,918 A | 6/1992 | Pardee | |
| 2002/0066632 A1* | 6/2002 | Kristen | B25D 16/003 |
| | | | 192/17 C |
| 2006/0279147 A1* | 12/2006 | Pardee | F16D 27/004 |
| | | | 310/77 |

FOREIGN PATENT DOCUMENTS

| | | |
|---|---|---|
| JP | S59 133840 A | 1/1984 |
| JP | 2013-234723 A | 11/2013 |

* cited by examiner

ELECTROMAGNETIC CLUTCH

BACKGROUND OF THE INVENTION

The present invention relates to an electromagnetic clutch including a braking mechanism that prevents an inertial rotation and slip on the output side after power transmission is cut off.

An electromagnetic clutch including a brake that works at the time of power cutoff is disclosed in, for example, Japanese Patent Laid-Open No. 2013-234723 (literature). The electromagnetic clutch disclosed in this literature includes a rotor that rotates integrally with an input shaft portion, an armature facing the rotor, and a braking member located on the opposite side of the rotor when viewed from the armature. The input shaft portion rotates upon receiving transmitted power. The rotor forms part of a magnetic circuit that passes a magnetic flux of an exciting coil. The armature is supported, via a plurality of leaf springs, by a pulley that is rotatably supported by the input shaft portion via a bearing.

In this electromagnetic clutch, when the exciting coil is excited, the armature is magnetically attracted by the rotor, and the rotation of the rotor is transmitted from the armature to the pulley via the leaf springs. When the exciting coil changes to a non-excitation state, the armature is separated from the rotor by the spring force of the leaf springs and pressed against the braking member. When the armature is pressed against the braking member in this way, a braking force acts on the armature, and the pulley stops together with the armature.

The pulley includes a cylindrical portion fitted on the outer ring of the above-described bearing, and an inner flange radially extending inward from the cylindrical portion. The inner flange is located between the bearing and the rotor in the axial direction. One-end portions of the above-described leaf springs are fixed to the inner flange by rivets. The end of each rivet projects inside the cylindrical portion. To prevent the outer ring of the bearing from hitting the ends of the rivets, a plurality of projections that abut against the outer ring of the bearing from the rotor side are formed on the inner flange. These projections abut against the outer ring of the bearing, thereby holding the pulley unmovable in a direction opposite to the rotor. The plurality of projections are arranged in the rotation direction of the pulley. Holes used to insert the rivets through the inner flange cannot be formed at portions where the projections are formed, and are therefore formed between the projections adjacent to each other.

An electromagnetic clutch including a brake that works in a non-excitation state, like the electromagnetic clutch described in the literature, is required to further increase the braking force of the brake and a holding force to hold the pulley at a standstill. The braking force or holding force can probably be increased by increasing the number of leaf springs. In the electromagnetic clutch described in the literature, however, since the projections are formed on the inner flange of the pulley, and portions where leaf springs can be attached are narrow, the number of leaf springs cannot be increased.

SUMMARY OF THE INVENTION

The present invention has been made to solve the above-described problem, and has as its object to increase the number of spring members that bias the armature of an electromagnetic clutch.

In order to achieve the object, according to the present invention, there is provided an electromagnetic clutch comprising an input shaft portion that rotates upon receiving transmitted power, a rotor that radially extends outward from the input shaft portion and rotates integrally with the input shaft portion, a field core that includes an exciting coil and is provided at a position where a magnetic flux of the exciting coil passes through the rotor on one side of the rotor in an axial direction in a state in which rotation is regulated, a braking member arranged on the other side of the rotor in the axial direction in the state in which rotation is regulated, a bearing provided on the other side of the rotor in the axial direction on the input shaft portion, a rotation transmission member that includes a movement regulating portion that abuts against the bearing from a side of the rotor and regulates movement of the rotation transmission member to the one side in the axial direction and is rotatably supported by the input shaft portion via the bearing, the movement regulating portion including a plurality of abutment portions that are formed at intervals in a rotation direction of the rotation transmission member and abut against the bearing, a connecting member that is overlaid on one surface of the movement regulating portion in the axial direction, the connecting member including a plurality of first holes respectively provided at portions facing the plurality of abutment portions and a plurality of second holes provided at portions facing regions between the plurality of abutment portions, an armature that is formed into an annular shape with a through hole at a center and arranged between the rotor and the braking member in a state in which the input shaft portion is inserted in the through hole, and is movable in the axial direction by a distance corresponding to an air gap, a plurality of first spring members and a plurality of second spring members which include one-end portions attached to the armature and other-end portions and support the armature while biasing the armature toward the braking member, a plurality of first fixing members that are inserted into the plurality of first holes of the connecting member, respectively, and fix the other-end portions of the plurality of first spring members to the connecting member, and a plurality of second fixing members that are inserted into the plurality of second holes of the connecting member, respectively, and fix the other-end portions of the plurality of second spring members and the connecting member to the regions of the movement regulating portion.

DESCRIPTION OF THE PREFERRED EMBODIMENT

Figure 1:
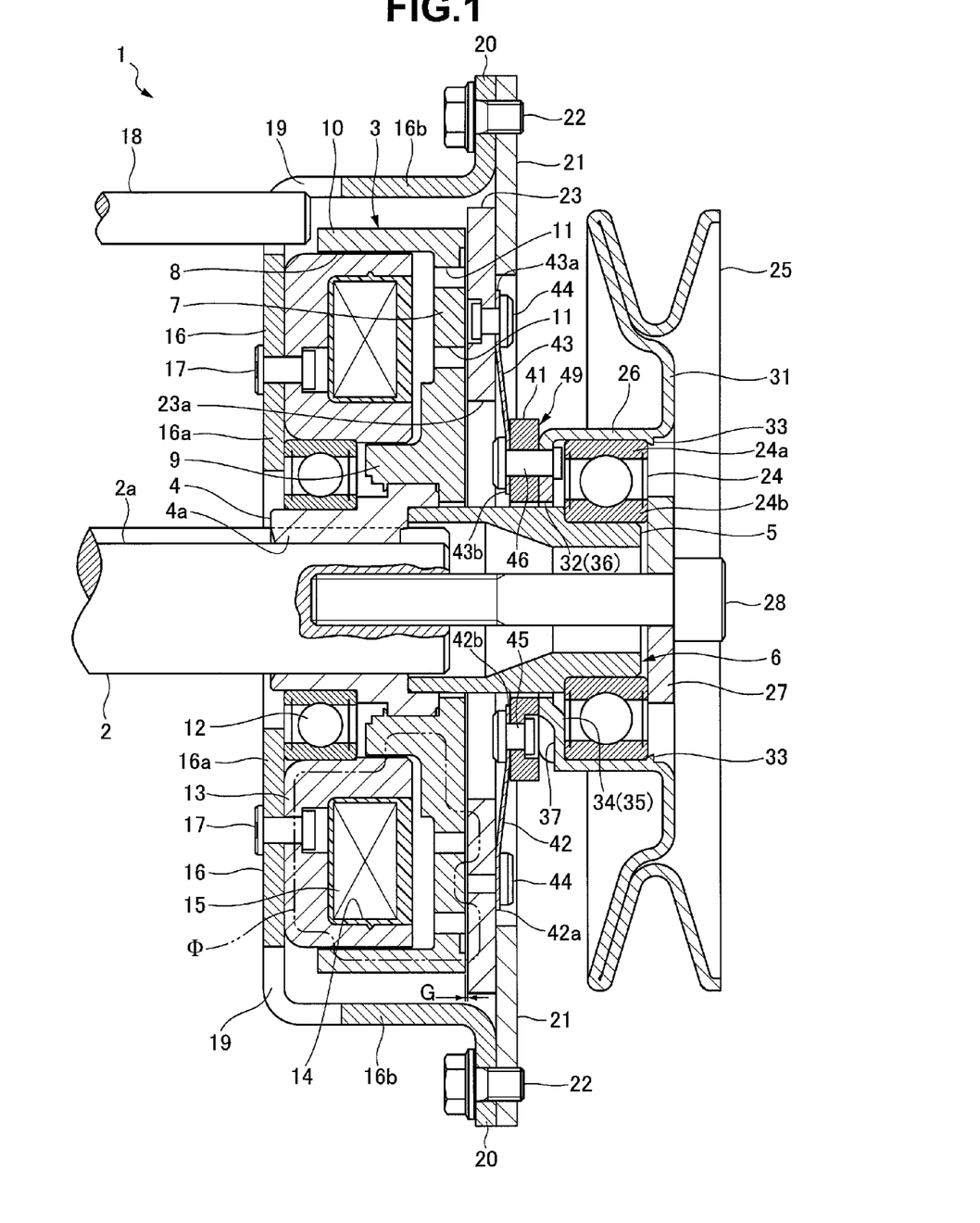
FIG. 1 is a sectional view of an electromagnetic clutch according to an embodiment of the present invention.

An electromagnetic clutch according to an embodiment of the present invention will now be described in detail with reference to FIGS. 1 to 9. An electromagnetic clutch shown in FIG. 1 is attached to an input shaft 2 that extends in the left/right direction in FIG. 1. Here, an explanation will be made assuming that the distal end side (the right side in FIG. 1) of the input shaft 2 is the front side of an electromagnetic clutch 1, and the opposite side as the rear side of the electromagnetic clutch 1 for the descriptive convenience.

The input shaft 2 is driven by a driving apparatus, for example, an engine (not shown) or a motor (not shown) and rotates. A boss portion 4 of a rotor 3 (to be described later) is attached to the input shaft 2. The boss portion 4 includes a concave portion 4a fitted in a key groove 2a of the input shaft 2, and rotates integrally with the input shaft 2 by key fitting. A cylindrical bearing collar 5 is welded to the distal end of the boss portion 4. In this embodiment, the input shaft 2, the boss portion 4, and the bearing collar 5 form an input shaft portion 6 that rotates upon receiving transmitted power.

The rotor 3 includes a disc portion 7 that is fixed to the outer surface of the boss portion 4 and radially extends outward from the boss portion 4, and an inner cylindrical portion 9 and an outer cylindrical portion 10, which form, on the rear side of the disc portion 7, an annular groove 8 opening to the rear side of the electromagnetic clutch 1. The rotor 3 rotates integrally with the input shaft portion 6.

A plurality of arcuated slits 11 are formed in the disc portion 7 of the rotor 3. The slits 11 extend in the circumferential direction of the rotor 3 and extend through the disc portion 7 in the axial direction of the input shaft 2. The slits 11 are arranged in pairs in the radial direction of the disc portion 7 and formed at a plurality of portions in the circumferential direction of the disc portion 7. A field core 13 is supported, via a first bearing 12, by the rear end of the above-described boss portion 4.

The field core 13 is formed into an annular shape. An annular groove 14 opening to the front side of the electromagnetic clutch 1 is formed in the field core 13. An exciting coil 15 is stored in the annular groove 14. The exciting coil 15 is fed by power cables 15a derived from a rear end face 13a (see FIG. 3) of the field core 13. The field core 13 is inserted in the annular groove 8 of the rotor 3. That is, the field core 13 is arranged at a position on the rear side of the rotor 3 (on one side in the axial direction), where a magnetic flux Φ of the exciting coil 15 passes through the rotor 3.

Figure 3:
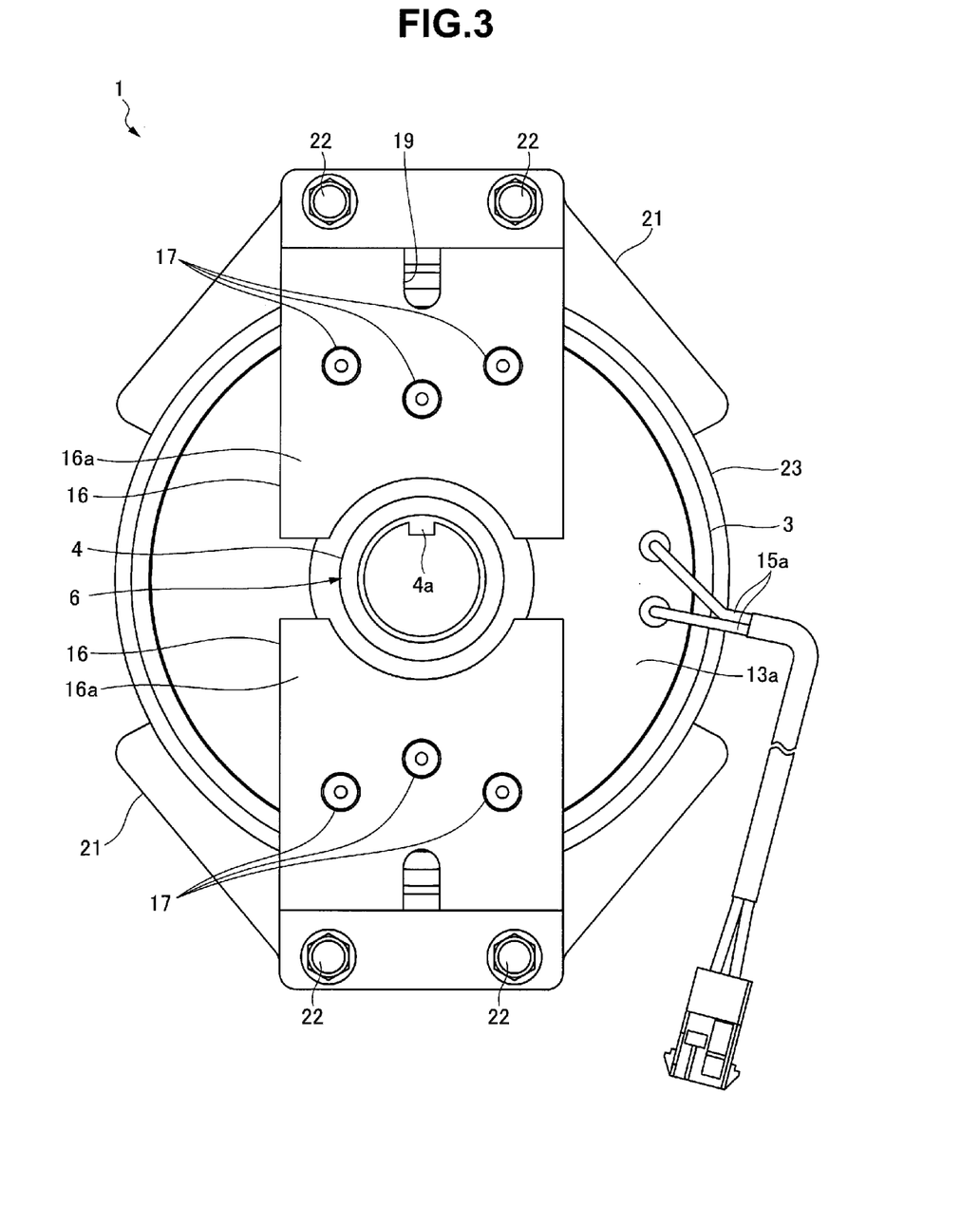
FIG. 3 is a front view of the electromagnetic clutch shown in FIG. 1.

A pair of locking members 16 for preventing the field core 13 from rotating together with the input shaft 2 are fixed to the rear end of the field core 13 by rivets 17. Each of the locking members 16 is formed by bending a rectangular metal plate material into a predetermined shape by press work. That is, as shown in FIGS. 1 and 3, the locking members 16 include flat portions 16a extending in the radial direction of the field core 13 along the rear end face 13a of the field core 13, and two arm portions 16b (see FIG. 1) extending from the ends of the flat portions 16a in parallel to the axial direction of the input shaft 2.

A hole 19 used to insert a connecting member 18 that connects the locking member 16 and a fixed housing (not shown) is formed at each of the ends of the flat portions 16a. As shown in FIG. 1, the two arm portions 16b are located outside in the radial direction of the rotor 3 and project from the rotor 3 to the front side of the electromagnetic clutch 1. The distal end portion of each arm portion 16b is bent outward in the radial direction of the rotor 3 to form a mounting plate 20.

Figure 4:
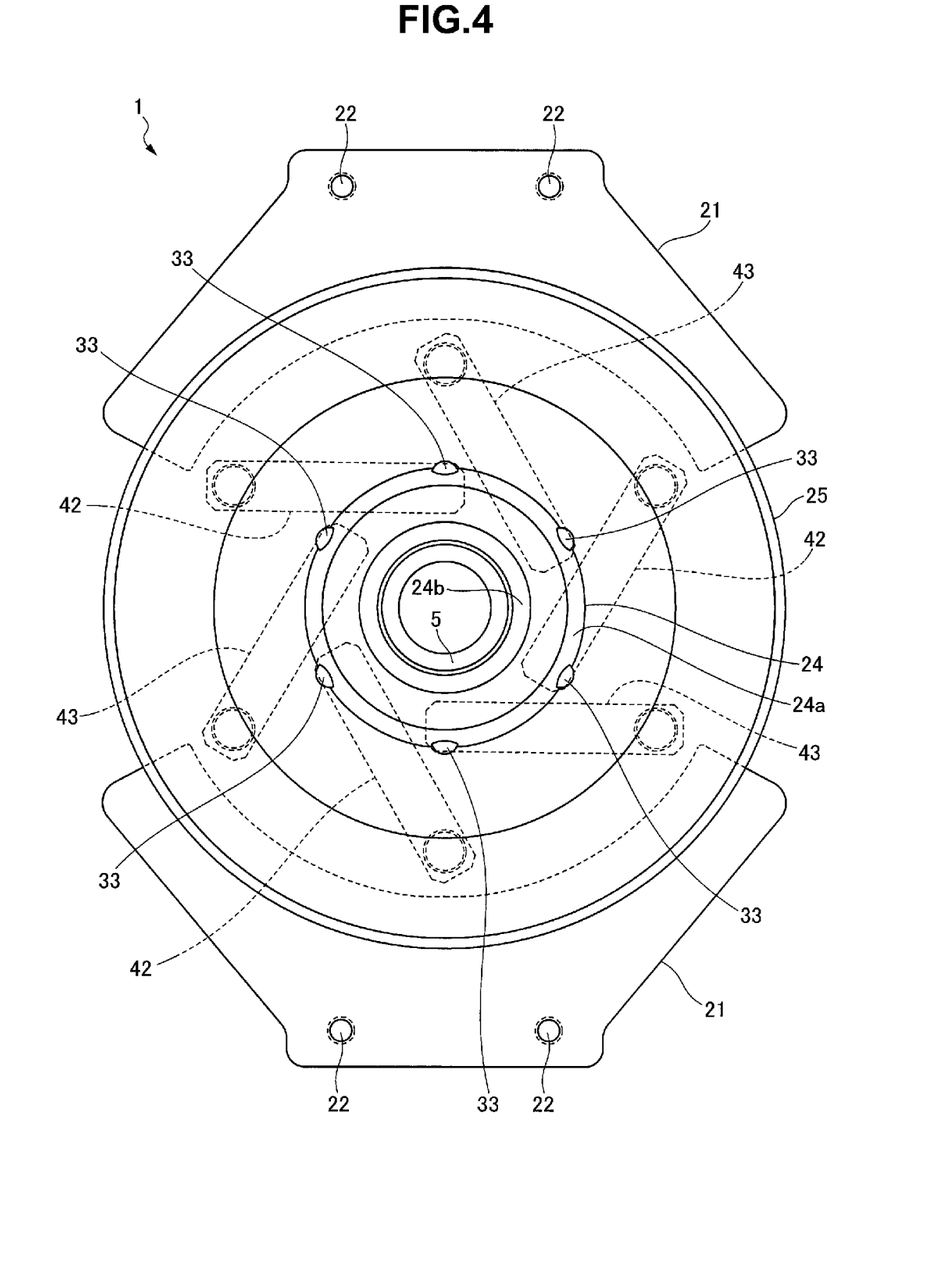
FIG. 4 is a rear view of the electromagnetic clutch shown in FIG. 1.

Braking plates 21 are attached to the mounting plates 20 by mounting bolts 22, respectively. Rotation of the braking plates 21 is also regulated like the field core 13. The braking plates 21 are used to break an armature 23 inserted between the rotor 3 and the braking plates 21 by a frictional resistance generated upon contact with the armature 23 (to be described later). As shown in FIGS. 3 and 4, each the braking plate 21 is formed into a shape that extends from the locking member 16 in the circumferential direction of the rotor 3. In addition, the braking plates 21 are arranged on the front side of the rotor 3 (the other side in the axial direction), and an interval capable of inserting the armature 23 (to be described later) is formed between the rotor 3 and the braking plates 21, as shown in FIG. 1. In this embodiment, the braking plate 21 corresponds to a "braking member" of the present invention.

Figure 2:
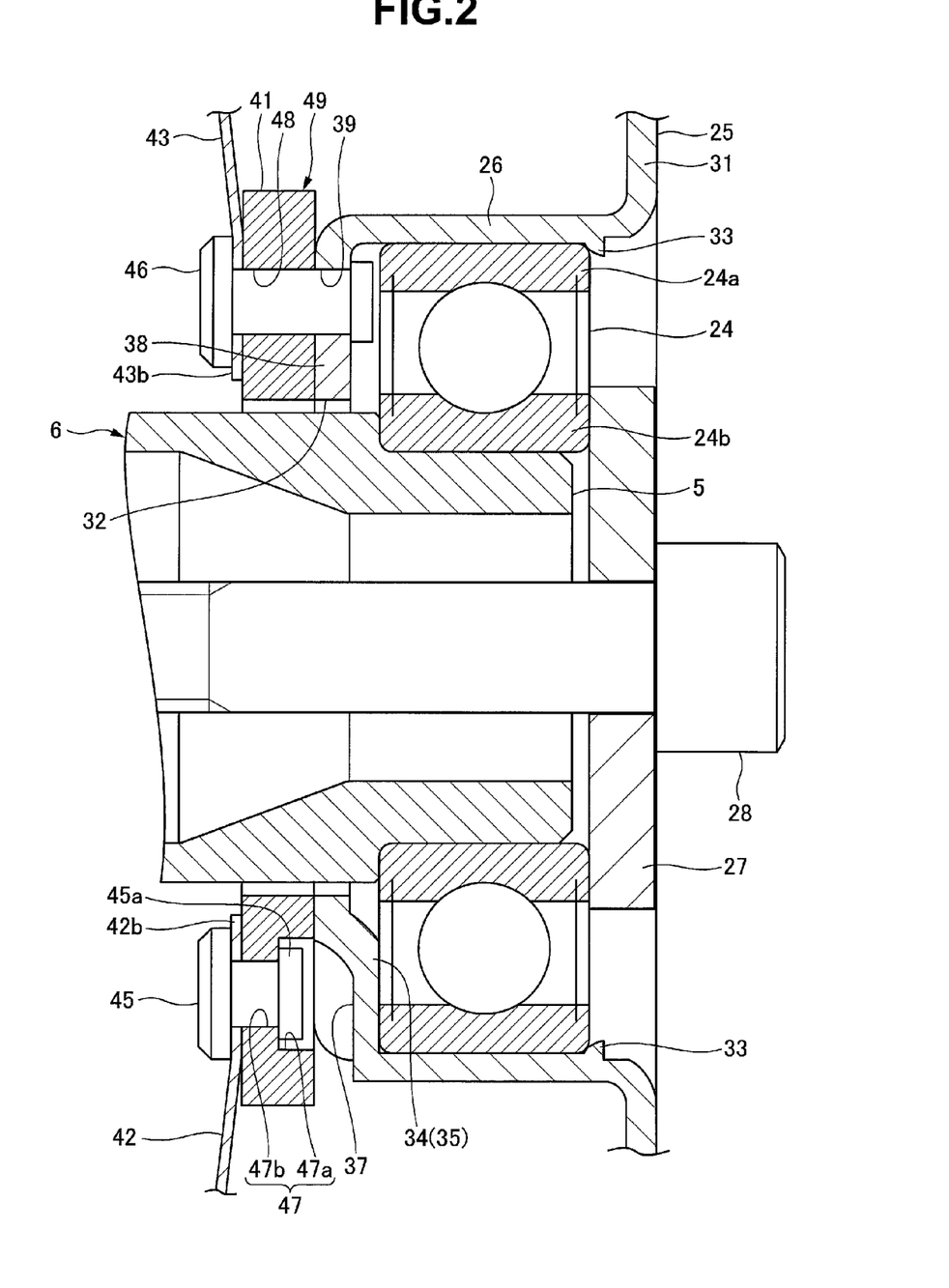
FIG. 2 is an enlarged sectional view of the main part of the electromagnetic clutch shown in FIG. 1.

As shown in FIGS. 1 and 2, a second bearing 24 is provided at the front end of the bearing collar 5 welded to the front end of the boss portion 4 of the rotor 3. The second bearing 24 is provided on the front side of the rotor 3 (the other side in the axial direction) on the input shaft portion 6. The second bearing 24 corresponds to a "bearing" of the present invention. A cylindrical portion 26 of a pulley 25 (to be described later) is fitted on an outer ring 24a of the second bearing 24. That is, the pulley 25 is rotatably supported by the input shaft portion 6 via the second bearing 24. An inner ring 24b of the second bearing 24 is pressed backward from the front side by a press plate 27. The press plate 27 is pressed against the inner ring 24b by a fixing bolt 28 screwed into the input shaft 2.

Figure 5:
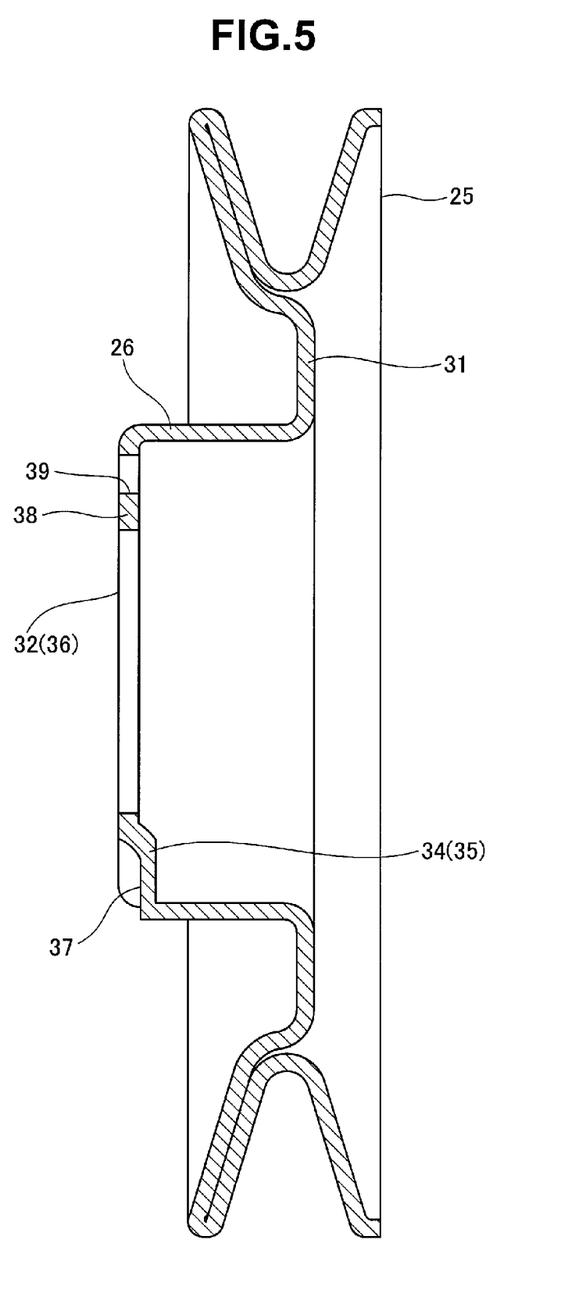
FIG. 5 is a sectional view of a pulley.
Figure 6:
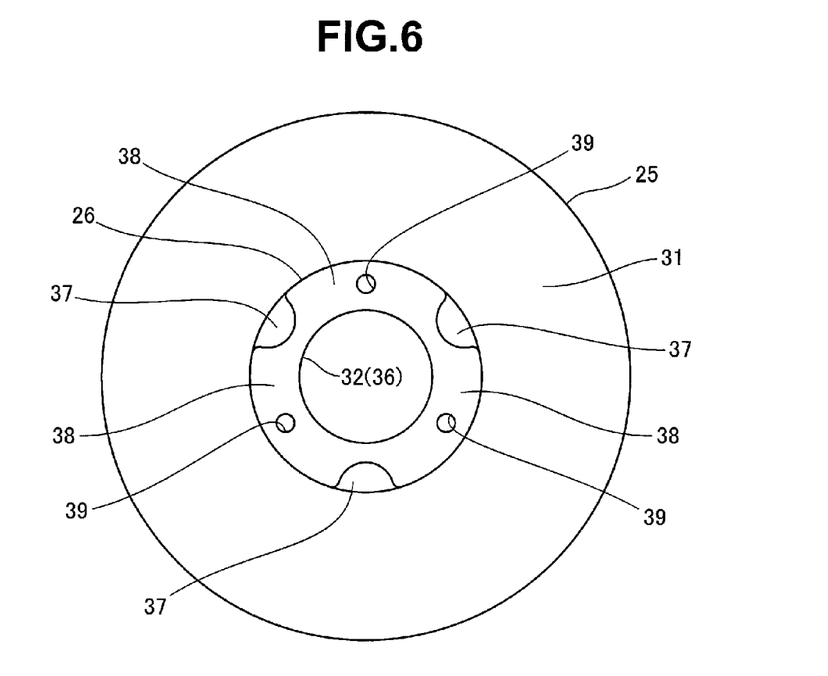
FIG. 6 is a front view of the pulley.

The pulley 25 is a so-called steel pulley, and includes the above-described cylindrical portion 26, a pulley body 31 radially extending outward from the front end of the cylindrical portion 26, and an inner flange 32 connected to the rear end (one end in the axial direction) of the cylindrical portion 26, as shown in FIGS. 1, 2, and 5. In this embodiment, the pulley 25 forms a "rotation transmission member" of the present invention.

A V belt (not shown) is looped over the pulley body 31. A caulking piece 33 is formed at the front end of the cylindrical portion 26 to prevent the pulley 25 from moving backward with respect to the second bearing 24. The caulking piece 33 is formed by making part of the inner surface of the cylindrical portion 26 radially project inward by press work, and pressed against the front end face of the outer ring 24a from the front side.

Figure 7:
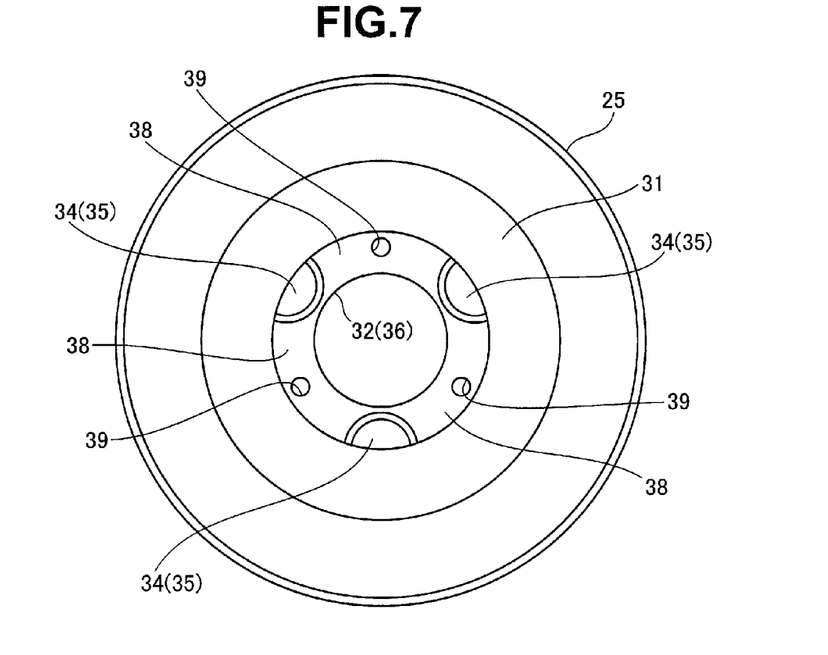
FIG. 7 is a rear view of the pulley.

The inner flange 32 has two functions. The first function is the function of regulating forward movement of the pulley 25 with respect to the second bearing 24. To implement the first function, the inner flange 32 is provided with a plurality of abutment portions 34. As shown in FIG. 7, the abutment portions 34 are arranged at intervals in the rotation direction of the pulley 25. In this embodiment, the abutment portions 34 are provided at positions to equally divide the pulley 25 into three parts in the rotation direction. The abutment portions 34 are formed by making part of the outer edge of the inner flange 32 and part of the cylindrical portion 26 partially plastically deform frontward by press. That is, the abutment portions 34 according to this embodiment are formed by plastically deformed portions 35 provided on the inner flange 32.

As shown in FIG. 2, the abutment portions 34 abut against the outer ring 24a of the second bearing 24 from behind (from the side of the rotor 3). That is, the inner flange 32 forms a movement regulating portion 36 that abuts against the second bearing 24 from the side of the rotor 3 in the axial direction and regulates forward movement of the pulley 25. The abutment portions 34 are formed on the outer periphery of the inner flange 32, thereby forming a plurality of concave portions 37 (see FIGS. 1, 2, and 6).

Regions that are not used to implement the first function are formed between the abutment portions 34 of the inner flange 32. These regions are called "non-effective portions 38". That is, the inner flange 32 includes a plurality of non-effective portions 38 located between the abutment portions 34 adjacent to each other in the rotation direction of the pulley 25. A through hole 39 is formed in each of the plurality of non-effective portions 38. In this embodiment, the through hole 39 corresponds to a "third hole" of the present invention.

The second function of the inner flange 32 is the function of supporting the armature 23 (to be described later). To implement the second function, as shown in FIGS. 1 and 2, a connecting member 41 overlaid on the rear end face (the surface on the other side in the axial direction) of the inner flange 32 and a plurality of first leaf springs 42 and second leaf springs 43 radially extending outward from the connecting member 41 are used.

The armature 23 is formed into an annular shape with a through hole 23a at the center. The armature 23 is arranged between the disc portion 7 of the rotor 3 and the braking plates 21 in a state in which the input shaft portion 6 is inserted in the through hole 23a, and supported by the first leaf springs 42 and the second leaf springs 43 so as to be movable in the axial direction. The first leaf springs 42 and the second leaf springs 43 support the armature 23 biased toward the braking plates 21. The first leaf springs 42 and the second leaf springs 43 according to this embodiment have the same shape. Each leaf spring is formed into a thin strip shape. In this embodiment, the first leaf spring 42 forms a "first spring member" of the present invention, and the second leaf spring 43 forms a "second spring member" of the present invention.

One-end portions 42a and 43a of the first leaf springs 42 and the second leaf springs 43 are attached to the armature 23 by rivets 44. Other-end portions 42b and 43b of the first leaf springs 42 and the second leaf springs 43 are attached to the connecting member 41 (to be described later) by first rivets 45 and second rivets 46, respectively. In this embodiment, the first rivet 45 and the second rivet 46 correspond to a "first fixing member" and a "second fixing member" of the present invention, respectively. Note that as the fixing member, not only a rivet but also a bolt, a nut, or a screw can be used.

Figure 8:
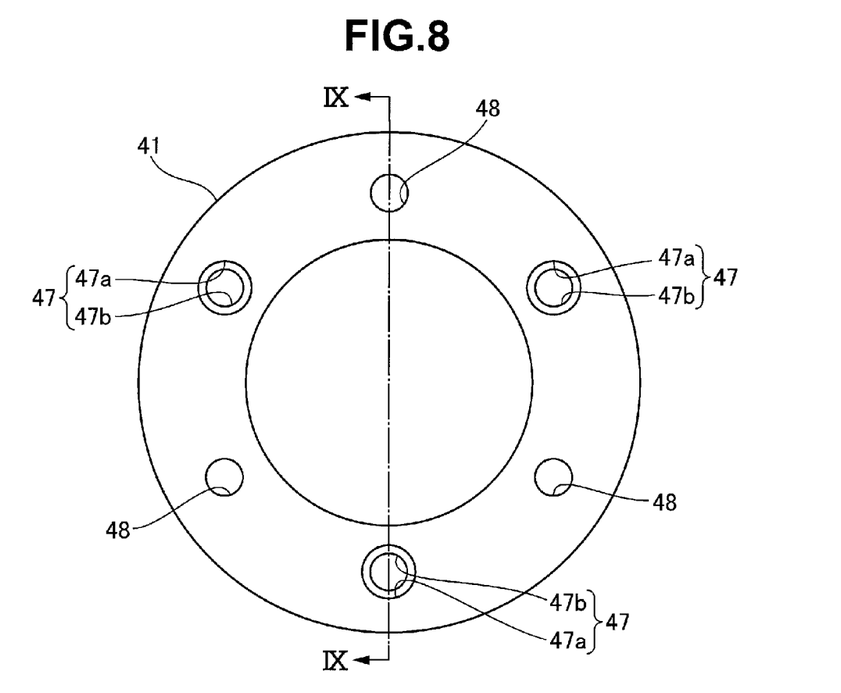
FIG. 8 is a rear view of a connecting member.
Figure 9:
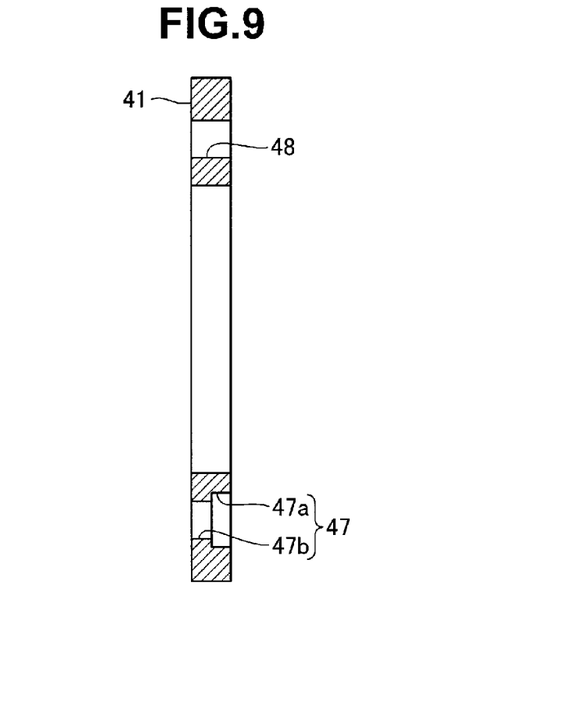
FIG. 9 is a sectional view taken along a line IX-IX in FIG. 8.

The armature 23 can move in the axial direction by a distance corresponding to an air gap G between the disc portion 7 and the braking plates 21 when the first leaf springs 42 and the second leaf springs 43 bend. As shown in FIGS. 8 and 9, the connecting member 41 is formed into an annular plate shape. A plurality of first rivet insertion holes 47 and a plurality of second rivet insertion holes 48 are formed in the connecting member 41.

The first rivet insertion holes 47 are each formed from a large-diameter hole 47a and a small-diameter hole 47b, as shown in FIG. 9, and provided at positions to equally divide the connecting member 41 into three parts in the circumferential direction, as shown in FIG. 8. More specifically, the first rivet insertion holes 47 are provided at positions facing the plurality of abutment portions 34 of the inner flange 32, as shown in FIG. 2. In this embodiment, the first rivet insertion hole 47 corresponds to a "first hole" of the present invention.

As shown in FIG. 2, the first rivets 45 are inserted into the first rivet insertion holes 47. The first rivets 45 extend through the connecting member 41 and the other-end portions 42b of the first leaf springs 42, and fix the other-end portions 42b of the first leaf springs 42 to the rear surface of the connecting member 41. That is, the other-end portions 42b of the first leaf springs 42 are attached to the connecting member 41 by the first rivets 45 inserted into the first rivet insertion holes 47 and fixed to the inner flange 32 via the connecting member 41. Proximal-side large-diameter portions 45a (front ends) of the first rivets 45 are stored in the large-diameter holes 47a of the first rivet insertion holes 47, and face the above-described concave portions 37 of the inner flange 32.

The second rivet insertion holes 48 are each formed from a through hole having a predetermined diameter, as shown in FIG. 9, and provided between the first rivet insertion holes 47 adjacent to each other at positions to equally divide the connecting member 41 into three parts in the circumferential direction, as shown in FIG. 8. In addition, the second rivet insertion holes 48 are provided at positions (portions facing the non-effective portions 38 of the inner flange 32) facing the through holes 39 of the above-described inner flange 32, as shown in FIG. 2. In this embodiment, the second rivet insertion hole 48 corresponds to a "second hole" of the present invention.

The second rivets 46 are inserted into the second rivet insertion holes 48 and the through holes 39 of the inner flange 32. The second rivets 46 extend through the inner flange 32, the connecting member 41, and the other-end portions 43b of the second leaf springs 43, and fix the other-end portions 43b of the second leaf springs 43 and the connecting member 41 to the inner flange 32. Exactly speaking, the second rivets 46 fix the connecting member 41 to the rear surface of the inner flange 32, and also fix the other-end portions 43b of the second leaf springs 43 to the rear surface of the connecting member 41. That is, the other-end portions 43b of the second leaf springs 43 are fixed to the non-effective portions 38 of the inner flange 32 by a fixing structure 49 including the second rivets 46 inserted into the second rivet insertion holes 48. The fixing structure 49 according to this embodiment is formed from the second rivets 46 and the connecting member 41.

The first leaf springs 42 and the second leaf springs 43 are provided between the armature 23 and the connecting member 41 in a state in which they tilt with respect to the radial direction of the pulley 25 viewed from the front side, as shown in FIG. 4. The first leaf springs 42 are arranged at positions to equally divide the pulley 25 into three parts in the rotation direction. The second leaf springs 43 are located between pairs of first leaf springs 42 adjacent to each other.

In the electromagnetic clutch 1 having the above-described arrangement, when the exciting coil 15 is excited, the armature 23 is magnetically attracted by the rotor 3 and rotates integrally with the rotor 3. The rotation of the armature 23 is transmitted to the pulley 25 via the first leaf springs 42, the second leaf springs 43, and the connecting member 41. For this reason, power is transmitted from the input shaft 2 to the pulley 25 via the electromagnetic clutch 1.

When the exciting coil 15 changes to a non-excitation state, the armature 23 is separated from the rotor 3 by the spring force of the first leaf springs 42 and the second leaf springs 43 and pressed against the braking plates 21. When the armature 23 is pressed against the braking plates 21 in this way, a braking force is generated, and the pulley 25 that is inertially rotating is stopped and held in the stop state. The magnitudes of the braking force and the force to hold the pulley 25 in the stop state depend on the magnitude of the spring force of the first leaf springs 42 and the second leaf springs 43.

In this embodiment, the other-end portions 42b of the first leaf springs 42 are fixed to the connecting member 41 at positions corresponding to the abutment portions 34 provided on the inner flange 32 of the pulley 25. For this reason, when fixing the other-end portions 42b and 43b of the first leaf springs 42 and the second leaf springs 43 to the inner flange 32, attachable positions are not restricted by the abutment portions 34 of the inner flange 32. According to the electromagnetic clutch 1 having the above-described arrangement, the number of spring members that bias the armature 23 against the braking plates 21 increases by the number of first leaf springs 42, as compared to, for example, the electromagnetic clutch described in the literature. Hence, according to this embodiment, since the number of spring members that bias the armature 23 can be increased, the braking force and the holding force to hold the standstill state can be increased.

The pulley 25 according to this embodiment includes the cylindrical portion 26 in which the second bearing 24 is fitted, and the inner flange 32 radially extending inward from the cylindrical portion 26 and forming the movement regulating portion 36. The abutment portions 34 are formed from the plastically deformed portions 35 that are formed by making part of the inner flange 32 project toward the second bearing 24. The proximal-side large-diameter portions 45a as one-end portions of the first rivets 45 face the concave portions 37 made by forming the abutment portions 34 on the inner flange 32. It is therefore possible to form the pulley 25 using the steel pulley 25 and reduce the weight of the pulley 25. Hence, the time until the pulley 25 stops can be shortened without changing the spring force of the first leaf springs 42 and the second leaf springs 43 and the arrangement of the braking plates 21.

The other-end portions 43b of the second leaf springs 43 according to the above-described embodiment are fixed to the inner flange 32 via the connecting member 41. It is therefore possible to form the first leaf springs 42 and the second leaf springs 43 into the same shape and reduce the cost.

What is claimed is:

1. An electromagnetic clutch comprising:
   an input shaft portion that rotates upon receiving transmitted power;
   a rotor that radially extends outward from the input shaft portion and rotates integrally with the input shaft portion;
   a field core that includes an exciting coil and is provided at a position where a magnetic flux of the exciting coil passes through the rotor on one side of the rotor in an axial direction in a state in which rotation is regulated;
   a braking member arranged on the other side of the rotor in the axial direction in the state in which rotation is regulated;
   a bearing provided on the other side of the rotor in the axial direction on the input shaft portion;
   a rotation transmission member that includes a movement regulating portion that abuts against the bearing from a side of the rotor and regulates movement of the rotation transmission member to the one side in the axial direction and is rotatably supported by the input shaft portion via the bearing, the movement regulating portion including a plurality of abutment portions that are formed at intervals in a rotation direction of the rotation transmission member and abut against the bearing;
   a connecting member that is overlaid on one surface of the movement regulating portion in the axial direction, the connecting member including a plurality of first holes respectively provided at portions facing the plurality of abutment portions and a plurality of second holes provided at portions facing regions between the plurality of abutment portions;
   an armature that is formed into an annular shape with a through hole at a center and arranged between the rotor and the braking member in a state in which the input shaft portion is inserted in the through hole, and is movable in the axial direction by a distance corresponding to an air gap;
   a plurality of first spring members and a plurality of second spring members which include one-end portions attached to the armature and other-end portions and support the armature while biasing the armature toward the braking member;
   a plurality of first fixing members that are inserted into the plurality of first holes of the connecting member, respectively, and fix the other-end connecting member; and
   a plurality of second fixing members that are inserted into the plurality of second holes of the connecting member, respectively, and fix the other-end portions of the plurality of second spring members and the connecting member to the regions of the movement regulating portion, and
   wherein the movement regulating portion further includes a plurality of third holes provided in the regions, and the plurality of second fixing members are inserted into the plurality of second holes and the plurality of third holes.

2. The electromagnetic clutch according to claim 1, wherein the rotation transmission member (25) further includes a cylindrical portion in which the bearing is fitted,
   the movement regulating portion is formed from an inner flange radially extending inward from the cylindrical portion,
   each of the abutment portions is formed from a plastically deformed portion formed by making part of the inner flange project toward the bearing, and
   a one-end portion of each of the first fixing members faces a concave portion made by forming the abutment portion on the inner flange.

3. The electromagnetic clutch according to claim 1, wherein each of the plurality of first fixing members and the plurality of second fixing members is formed from a rivet.

* * * * *